M. G. Briggs,
Ironing Table,
No. 78,642. Patented June 9, 1868.

Witnesses:
Edward Griffith
Chas. B. Souther.

Inventor:
M. G. Briggs.
by her attorney
Frederick Curtis.

United States Patent Office.

M. G. BRIGGS, OF BOSTON, MASSACHUSETTS.

Letters Patent No. 78,642, dated June 9, 1868.

IMPROVED FOLDING OR IRONING-TABLE.

*The Schedule referred to in these Letters Patent and making part of the same.*

TO ALL PERSONS TO WHOM THESE PRESENTS SHALL COME:

Be it known that I, M. G. BRIGGS, of Boston, county of Suffolk, and State of Massachusetts, have invented a new and improved Portable Folding Table or Ironing-Board; and do hereby declare the following to be a full, clear, and exact description thereof, due reference being had to the accompanying drawings, making part of this specification, and in which—

Figure 1:
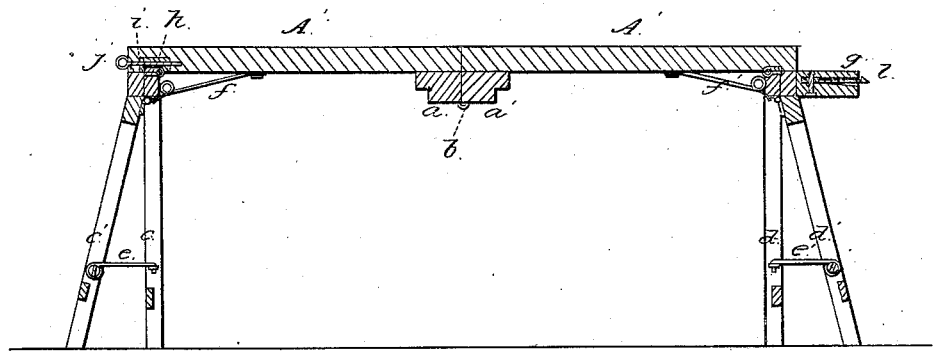
Figure 2:
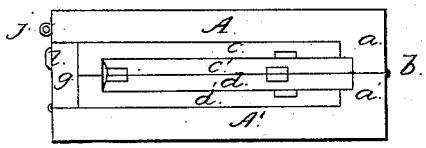

Figure 1 is a vertical and longitudinal section,

Figure 2 a side view, and

Figure 3:
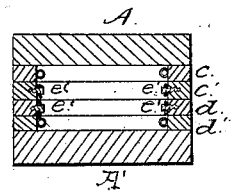

Figure 3 a transverse section of it in a folded table.

This invention has for its object to provide a folding table or bench, which, while answering as a substantial and steady support for the work of various kinds to be performed upon it, is capable of being folded and reduced in bulk in such manner as to occupy but little of the space required for it when in an extended or working state.

The invention consists of two rectangular boards or "leaves," hinged together in such manner as to fold or double upon one another, the outer ends of such leaves having double legs pivoted to them in such manner as to serve as supports for the combined leaves when in an extended state, and to be capable of being folded or turned over upon the leaves, when in a closed state, essentially in manner and for the purpose as hereinafter explained.

By referring to the accompanying drawings, it will be seen that the two "leaves" before mentioned are designated by the letters A A', such leaves being hinged together at one end, as shown at $b$, by which means they may be folded inward upon one another, the hinges being screwed to cross-bars $a\ a'$ extended across the inner ends of the leaves.

$c\ c'$ and $d\ d'$ denote two pairs of cross-frames, pivoted together at their upper or outer extremities, the inner ones, $c$ and $d$, being in turn pivoted to the under side of the outer ends of the leaves A A, and all being nearly equal in length with such leaves, in order to support them at a proper height above the floor.

The object in pivoting the cross-sections together at top is to allow of their diverging from such point for the purpose of creating a firm support for the extended leaves, a hook, $e$ or $e'$, being applied to each frame in a suitable position for locking the two together.

Furthermore, I apply to the under side of each leaf, A or A', a swivelling arm or stop, $f$ or $f'$, which, when the cross-frames or legs are in an unfolded or extended state, are to be turned up in contact with such legs and serve as a brace to retain such legs firmly in place, and make a substantial and steady table or bench of the leaves A A'.

The outer extremity of one of the leaves A A' has hinged to it a narrow auxiliary leaf, $g$, the connection of the two being such that when the apparatus is in an extended state, the upper surface of such auxiliary leaf is level with the under side of the primary leaves.

The auxiliary leaf, when the apparatus is extended into the form of a table, forms a shelf for supporting a flat-iron, starch-bowl, or other household-utensil, when the apparatus is in a folded state, serving as one end of the case, into which the structure is contracted, the cross-bars $a\ a'$, before mentioned, serving as the opposite end of such case.

When applying the extended table for the purposes of a "press-board," it becomes necessary to detach one of the leaves A A' from its cross-frames or supporting-legs.

To accomplish this, I apply the hinges of one pair of such legs to a bar, $h$, and I insert this bar, $h$, into a recess, $i$, made in the under side of one of the leaves, and near the end of the same, the bar being retained in place within its recess, by a pin, $j$, passed through it and the end of the leaf, or in any suitable way.

The auxiliary leaf $g$ is to be provided with a suitable spring, $l$, for locking it to the end of the leaf A when the apparatus is folded.

When it becomes necessary to use the table as a press-board, the pin $j$ is to be removed, the leaf A or A' to be detached from its legs and raised above them, and the dress or shirt to be ironed extended about such leaf, which is then to be returned to place and secured to its leg.

Fig. 1 of the accompanying drawings shows the device in an extended state, and fig. 2 in a folded or reduced state, as the operation of changing it from one position to the other will readily explain itself to intelligent persons. From the above description, further explanation upon this point is not considered necessary.

The small compass in which the folded apparatus is compressed will recommend it to many persons where an ordinary table cannot be kept. To ladies residing at hotels or in contracted apartments, as well as for persons living in small houses, its utility and practical value will be at once understood.

For paper-hangers' use, it will be valuable, constituting, as it does, a perfect table or bench when extended, and saving the necessity of hunting about for barrels or other objects upon which to place the present cumbrous boards.

I claim as my invention, and desire to secure by Letters Patent of the United States—

The apparatus or device above described, consisting of the leaves A A', twin cross-frames or legs $c$ $c'$ $d$ $d'$, and auxiliary leaf or shelf $g$, the legs being pivoted to each other and to the leaves, and provided with the stops $f$ or $f'$, and the whole operating together in manner and for the purpose as herein shown and described.

I also claim applying one pair of cross-frames or supports to the leaf by means of the bar $h$ and pin $f$, or its equivalent, essentially in manner and for the purpose as explained.

M. G. BRIGGS.

Witnesses:
FRED. CURTIS,
EDWARD GRIFFITH.